(No Model.)

G. T. SONGER.
HARROW.

No. 478,649. Patented July 12, 1892.

Witnesses:
B. S. Ober
W. S. Duvall

Inventor
Gordon T. Songer
By his Attorneys,
C. A. Snow & Co.

UNITED STATES PATENT OFFICE.

GORDON T. SONGER, OF ELIZABETHTON, TENNESSEE, ASSIGNOR OF ONE-HALF TO WILLIAM E. CARTER, OF SAME PLACE.

HARROW.

SPECIFICATION forming part of Letters Patent No. 478,649, dated July 12, 1892.

Application filed May 28, 1891. Serial No. 394,363. (No model.)

*To all whom it may concern:*

Be it known that I, GORDON T. SONGER, a citizen of the United States, residing at Elizabethton, in the county of Carter and State of Tennessee, have invented a new and useful Harrow, of which the following is a specification.

This invention relates to improvements in harrows; and the objects in view are to provide a combined harrow and cultivator especially adapted to harrow the ground preparatory to the planting of corn.

The objects in view are to provide a harrow of cheap and simple construction adapted to cultivate simultaneously the center and sides of a furrow and to yield readily and adapt itself to the various inequalities of the ground.

Other objects and advantages of the invention will appear in the following description, and the novel features thereof will be particularly pointed out in the claims.

Figure 1:
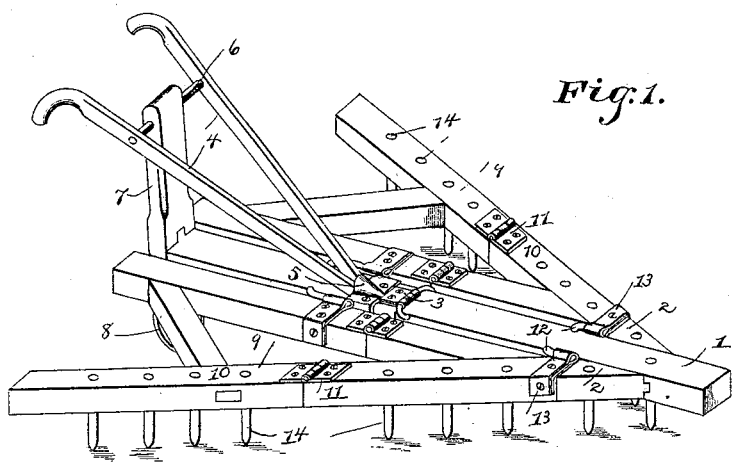
Figure 2:
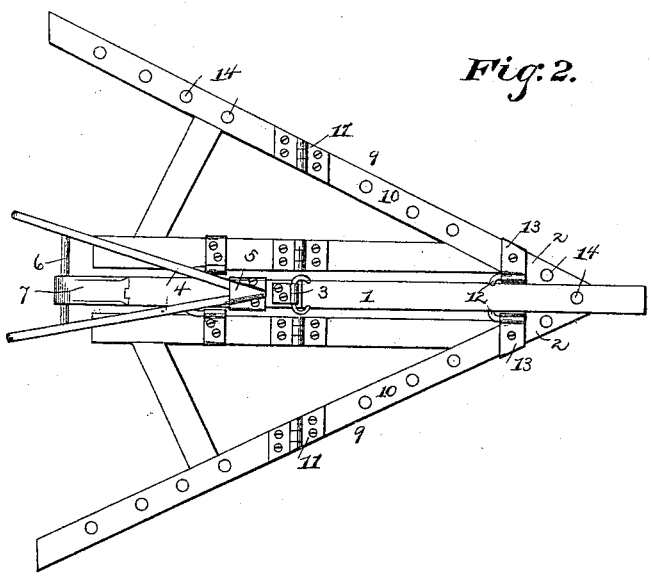

Referring to the drawings, Figure 1 is a perspective of a harrow constructed in accordance with my invention. Fig. 2 is a plan.

Like numerals of reference indicate like parts in both the figures of the drawings.

In constructing my harrow I employ a central beam 1, provided near its front end with a pair of triangular wings 2. The beam is formed in sections, which latter are loosely hinged together by hinges 3. Handles 4 extend rearwardly from a socket 5, secured to the beam and are connected by a rung 6 near their upper ends, which rung also passes through the upper end of a cultivator-standard 7, into which at about its center the beam 1 is tenoned. At its lower end the standard is provided with the cultivator-shovel 8.

9 designates a pair of harrow-sections, each of which consists of a pair of harrow-bars mortised at their front ends and diverging toward their rear ends. The harrow-bars 10 are formed in sections, and, like the beam 1, the sections are connected by hinges 11, said harrow-bars having teeth 14.

L-shaped locking-pins 12 extend from the upper corners of the beam 1 at each section thereof, and hinge-straps 13 occupy corresponding positions upon each of the inner beams of the sections. The pins or pintles 12 are inclined, and the wings may be connected thereto by raising the wings to near a vertical position, engaging the eyes of the straps with the pintles, and lowering the sections in rear of the wings 2, which, preventing any forward movement upon the part of the sections, prevents the hinges from disengaging with the pins or pintles.

A harrow thus constructed is adapted for furrowing one way in preparing the ground for the planting of corn, thus saving the time and labor of the horse and man. By reason of the flexible connections between the sections the harrow is adapted to all the undulations or inequalities of the land, thus accomplishing its work at all points of the field. The rear halves of the harrow-sections may be disconnected by removing the pintles $11^a$, and when this has been accomplished I have a combined plow and cultivator for working between the rows of corn. The plow breaks the ground deep and close to the corn, while the harrow-teeth operate along the sides of the furrow.

Having described my invention, what I claim is—

1. In a harrow, the combination, with a central beam formed in sections terminating at its rear end in a plow-standard, of a pair of harrows consisting of a pair of converging side beams connected at their rear ends and formed in sections, hinges connecting the beam-sections, and hinges connecting the harrow-sections with the main beam, substantially as specified.

2. The combination, with the main beam formed in sections and terminating at its rear end in a cultivator-standard, said sections being hinged together and the front sections provided with triangular wings secured at opposite sides thereof, of a pair of triangular harrow-sections, the bars of which are formed in sections loosely and removably connected, hinge straps mounted upon the inner bars of the harrow-sections, and inclined L-shaped pintles extending from the corners of the cultivator-beam for engaging the straps, substantially as specified.

3. In a harrow, the combination, with the two opposite harrow-sections, of a central beam consisting of two flexibly-connected sections, the rear one of which terminates at its rear end in a shovel-carrying standard, and hinge connections between the front sections of the beam and the opposite harrow-sections, substantially as specified.

In testimony that I claim the foregoing as my own I have hereto affixed my signature in presence of two witnesses.

GORDON T. SONGER.

Witnesses:
J. N. EDENS,
W. E. CARTER.